(12) United States Patent
Miller et al.

(10) Patent No.: US 6,422,644 B1
(45) Date of Patent: Jul. 23, 2002

(54) CRASH BOX COMPONENT HOLDER

(75) Inventors: Dean T. Miller, Wyoming; Douglas A. Fischer, Grand Rapids; Brian K. Begg, Rochester Hills; Richard J. Weber, Grand Haven; Peter E. Mack, Holland, all of MI (US)

(73) Assignee: Lear Donnelly Overhead Systems, L.L.C., Southfield, MI (US)

( * ) Notice: Subject to any disclaimer, the term of this patent is extended or adjusted under 35 U.S.C. 154(b) by 0 days.

(21) Appl. No.: 09/786,406

(22) PCT Filed: Sep. 2, 1998

(86) PCT No.: PCT/US99/20211

§ 371 (c)(1),
(2), (4) Date: Mar. 1, 2001

(87) PCT Pub. No.: WO00/12358

PCT Pub. Date: Mar. 9, 2000

Related U.S. Application Data

(60) Provisional application No. 60/098,857, filed on Sep. 2, 1998.

(51) Int. Cl.$^7$ ............................ B60R 7/08; B60R 27/00; B60N 3/02; B62D 25/06
(52) U.S. Cl. ........................ 296/214; 296/189; 296/224; 296/313; 296/318
(58) Field of Search ................................ 296/214, 189, 296/146.7; 224/313, 318

(56) References Cited

U.S. PATENT DOCUMENTS

| | | | |
|---|---|---|---|
| 4,272,114 A | * | 6/1981 | Hirano et al. ............... 293/133 |
| 5,169,204 A | | 12/1992 | Kelman |
| 5,403,064 A | | 4/1995 | Mahler et al. |
| 5,531,499 A | * | 7/1996 | Vecchio et al. .......... 296/146.7 |
| 5,560,575 A | | 10/1996 | Krysiak |
| 5,636,891 A | | 6/1997 | Van Order et al. |
| 5,662,375 A | | 9/1997 | Adams et al. |
| 5,725,271 A | | 3/1998 | Patel et al. |
| 5,806,889 A | | 9/1998 | Suzuki et al. |
| 5,826,907 A | | 10/1998 | Saito et al. |
| 5,931,525 A | * | 8/1999 | Rickabus ..................... 296/214 |
| 6,336,672 B2 | * | 1/2002 | Beaver ........................ 296/214 |

FOREIGN PATENT DOCUMENTS

| | | | | |
|---|---|---|---|---|
| DE | 19625295 | * | 1/1997 | |
| JP | 406270673 | * | 9/1994 | |
| JP | 407172265 | * | 7/1995 | |
| JP | 407232583 | * | 9/1995 | |
| WO | 9739254 | * | 10/1997 | .............. 296/146.7 |

* cited by examiner

Primary Examiner—Joseph D. Pape
Assistant Examiner—Hilary Gutman
(74) Attorney, Agent, or Firm—Brooks & Kushman P.C.

(57) ABSTRACT

An energy dissipation assembly is provided for dissipating energy between a vehicle component and a vehicle sheet metal member. The assembly includes a collapsible crash box forming a central aperture therethrough for receiving the vehicle component. The collapsible crash box includes a plurality of collapsible levels oriented concentrically with respect to the central aperture. A sufficient impact against the component causes collapse of the plurality of levels between the component and the sheet metal member, thereby dissipating energy of the impact.

16 Claims, 3 Drawing Sheets

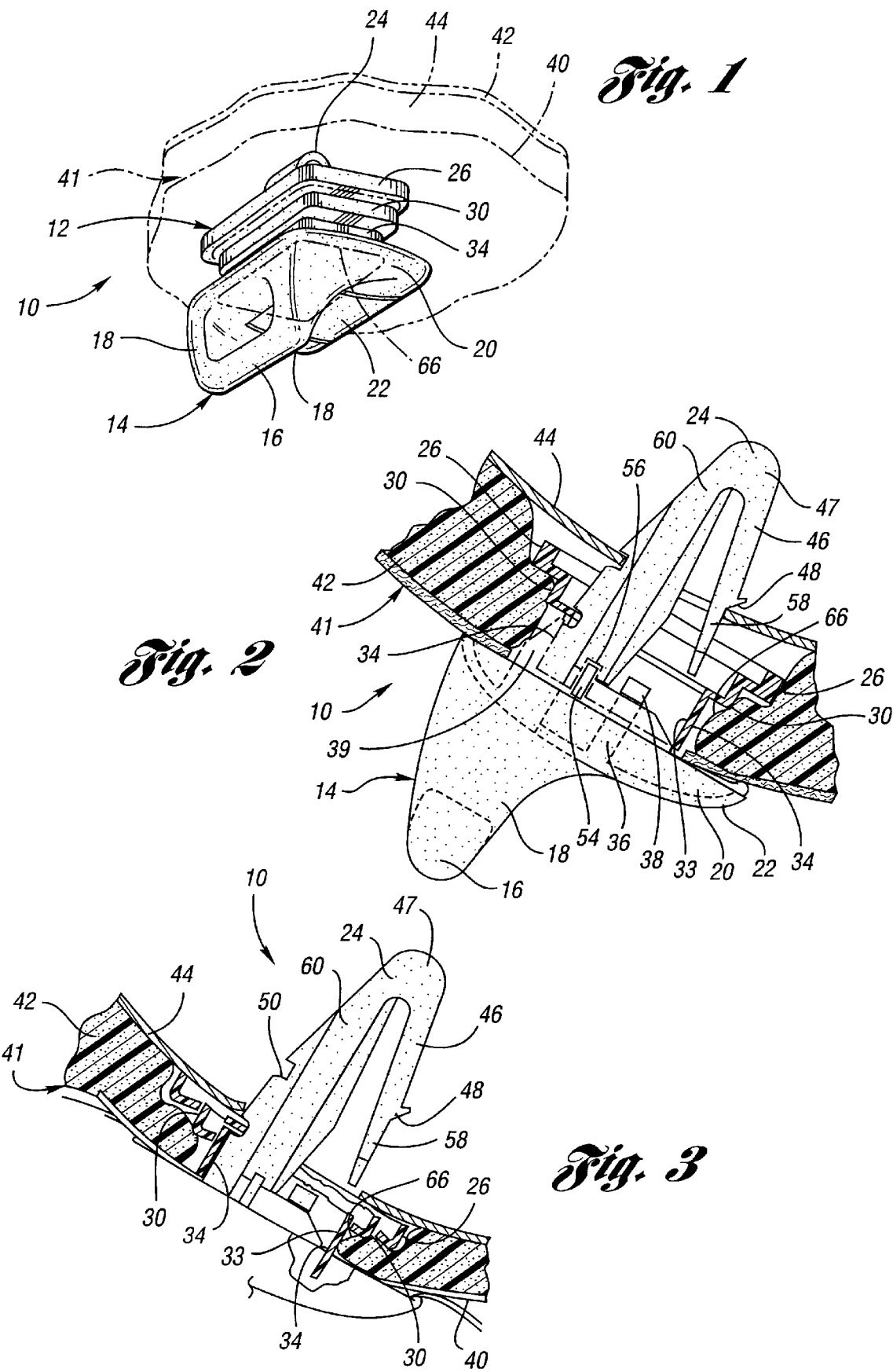

CRASH BOX COMPONENT HOLDER

CROSS-REFERENCE TO RELATED APPLICATION

This application claims the benefit of U.S. provisional application Ser. No. 60/098,857, which was filed on Sep. 2, 1998.

TECHNICAL FIELD

This invention relates to a collapsible crash box for dissipating energy between a coat hook and a vehicle roof.

BACKGROUND ART

It is know to mount various trim components, including conventional coat hooks, to a roof bracket of a motor vehicle interior. It is required by the Federal Motor Vehicle Safety Standard 201 that these components meet or exceed the head impact criteria values designated thereby. The prior art includes examples of components that can be attached to a roof bracket of a motor vehicle interior. However, these components are generally formed from one piece, do not provide easily changeable impact and deformation characteristics, and further, lack the stability, load bearing, and cosmetic characteristics desired in such components. Further, the components in the prior art do not conform readily to the contour of the headliner material of the motor vehicle.

DISCLOSURE OF INVENTION

According to the invention, a component mounting bracket for mounting a component in a headliner of a motor vehicle includes a collapsible crash box which includes at least one collapsible level oriented concentrically with respect to a supporting frame. At least one level of the crash box absorbs the impact along the longitudinal axis of the crash box by collapsing against a layer of sheet metal of the motor vehicle. The component such as a coat hook has a clip for retaining and securing the component within the sheet metal of the vehicle. The crash box farther comprises laterally spaced recesses for receiving tabs on the corresponding component. During a sufficient impact, the clip will move out of engagement with the sheet metal of the motor vehicle to further absorb the impact and promote passenger safety. In a second embodiment of the invention, the crash box has resilient legs to retain the crash box mounted to the sheet metal of the motor vehicle in the event that the component is removed from the vehicle.

More specifically, the invention provides an energy dissipation assembly for dissipating energy between a vehicle component and a vehicle sheet metal member. The assembly includes a collapsible crash box forming a central aperture therethrough for receiving the vehicle component. The collapsible crash box includes a plurality of collapsible levels oriented concentrically with respect to the central aperture. An uppermost one of the levels is positioned to abut against the sheet metal member and a lowermost one of the levels is positioned to abut against the component. A sufficient impact against the component causes collapse of the plurality of levels between the component and the sheet metal member, thereby dissipating energy of the impact.

Accordingly, an object of the invention is to provide a collapsible crash box for dissipating energy between a vehicle component and a sheet metal member, such as between a coat hook and a vehicle roof.

A further object of the invention is to provide a collapsible crash box for dissipating energy between a vehicle component and a vehicle roof, wherein the crash box provides sufficient stability, load bearing and cosmetic characteristics desired in such an application.

Other objects, features, and advantages of the invention will be apparent from the ensuing description in conjunction with the accompanying drawings.

BRIEF DESCRIPTION OF DRAWINGS

FIG. 1 is a perspective view of a preferred embodiment of a crash box component holder for a motor vehicle with a headliner of the motor vehicle in phantom lines for clarity;

FIG. 2 is a sectional side view of the crash box component holder of FIG. 1;

FIG. 3 is a side sectional view showing the crash box component holder of FIGS. 1 and 2 after impact due to, for example, a motor vehicle accident;

DETAILED DESCRIPTION OF THE PREFERRED EMBODIMENT

Figure 4:
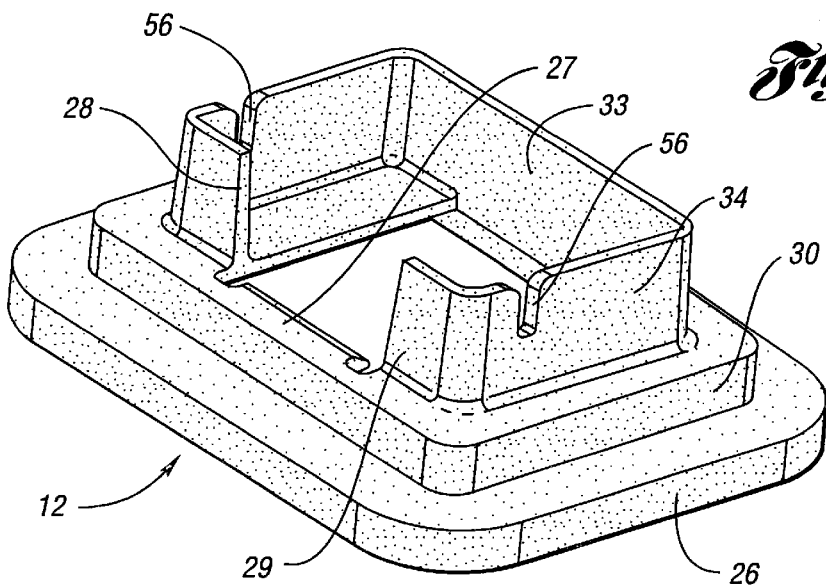
FIG. 4 is a perspective view of a crash box component holder of the present invention.

As shown in FIG. 1, an accessory and crash box component holder assembly 10 comprises a coat hook 14 secured by a crash box component holder 12, which may also be referred to as crash box 12, mounted within a headliner 41 of a motor vehicle. The coat hook 14 comprises a base 20 that sealingly abuts the headliner 41 in a cosmetically pleasing manner and mounts downwardly depending legs 18 connected by a cross bar 16. The coat hook 14 further comprises a door 22, which is secured in a closed position after assembly and which cannot be opened during normal use. The headliner 41 is shown in phantom lines in FIG. 1. The crash box component holder 12 is actually within the headliner 41 in an opening 66 thereof.

Figure 5:
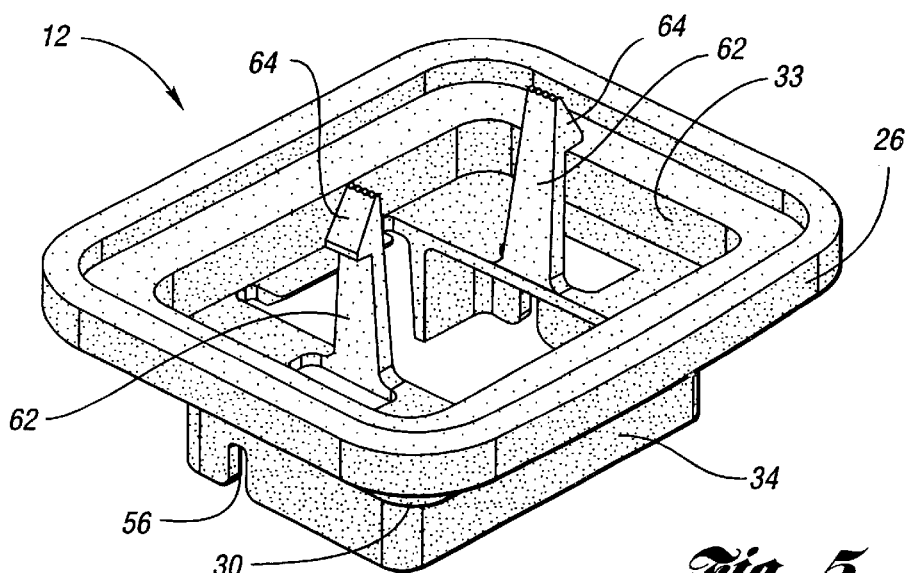
FIG. 5 is a perspective view of a second embodiment of the crash box component holder.

As shown in greater detail in FIG. 4, the crash box component holder 12 concentrically comprises a first rectangular level 26, a second rectangular level 30, and a third rectangular level 34. The third level 34 includes two small, laterally spaced recesses 56 and a large rectangular recess 28 on a front face 29 thereof. A flange 27 of the second level 30 extends into a center portion of the crash box 12. The flange 27 is aligned with the recess 28 of the third level 34 and is oriented perpendicular thereto at the elevation of the second level 30. The crash box component holder forms a central aperture 33 for receiving the coat hook 14. The first, second and third levels 26,30,34 are arranged concentrically about the central aperture. An alternative embodiment of the crash box 12 is shown in FIG. 5 wherein the crash box 12 comprises resilient legs 62 having tabs 64 that retain the crash box within the sheet metal of the motor vehicle during assembly and permit removal of a component such as the coat hook 14.

The headliner 41 of the motor vehicle comprises an outer fabric or vinyl layer 40 and a layer batting 42. The batting 42 abuts a sheet metal 44 which forms a part of the vehicle frame. As shown in FIG. 2, the coat hook 14 further comprises a clip 24, which secures the coat hook and crash box assembly 10 within the headliner 41. The clip 24 comprises a first arm 60 and a second arm 46 joined by a U-shaped portion 47. The first arm 60 further comprises a recess 50, which rigidly engages the sheet metal 44. The second arm 46 comprises a narrow end portion 58 separated from the remainder of the second arm 46 by a tab 48 which rigidly secures the second arm 46 to the sheet metal 44. The clip 24 is chosen such that the arms 60 and 46 must be moved closer with respect to each other to be inserted into a hole in the sheet metal 44 and therefore exert a spring force outwardly to rigidly retain the assembly 10 within the headliner 41. The clip 24 is fully disclosed in U.S. Pat. No. 5,662,375 which is incorporated herein by reference. As illustrated in FIG. 2, the headliner opening 66 is shaped to follow the contour of the outer surface 34 of the crash box 12.

The coat hook 14 further comprises locking tabs 54 that are received in the recesses 56 of the crash box 12 and a boss 39 that abuts the flange 27 within the recess 28 of the crash box 12 that cooperate to stabilize the coat hook 14 when the coat hook is mounted to the crash box 12. The. door 22 of the coat hook 14 mounts resilient legs 36 having tabs 38, which combine to secure the door 22 in a closed position in locking engagement with the base 20 of the coat hook 14.

If a motor vehicle accident or other unexpected occurrence causes a passenger's head, for example, or other object to strike the coat hook 14 with a sufficient upward force, the crash box 12 will absorb the impact and promote passenger safety by sequentially collapsing the levels 26,30, and 34 with respect to each other. As best shown in FIG. 2, the third (or lowermost) level 34 is not supported by the second level 30 against a sufficient vertical force, which, in turn, is not supported by the first (or uppermost) level 26 against a sufficient vertical force.

The result of a sufficient impact is illustrated in FIG. 3 where the third level 34 has collapsed into the second level 30 and the second level 30 has, in turn, collapsed into the first level 26. A further result of the impact is that the clip 24 disengages from the sheet metal 44 and moves upwardly thereof. This feature has the effect that the coat hook 14 may be able to be reused while the crash box 12, which has absorbed the impact, will need to be replaced.

It should be evident to one of skill in the art that the concept embodied by the crash box 12 can support any type of component for the headliner 41 or other part of the motor vehicle. It is the impact-absorbing and deformation characteristics of the crash box 12 that present the most important part of the invention. It is considered that any desirable impact-absorbing and deformation characteristics may be attained through appropriate choice of material and manufacturing technique. FIG. 2 shows the crash box spaced away from the sheet metal member. Spacing the crash box away from the coat hook would be an obvious variant of this structure.

The choice of the disclosed rectangular shape of the concentric levels 26,30, and 34 of the crash box 12 are merely preferences and it is considered that any suitable shape including but not limited to circles and triangles may be used. The disclosed number of concentric levels may also be increased and decreased to suit a particular application. Whereas the crash box has been shown with three crushable levels, it is within the scope of the invention to employ less than three levels, for example, one or two levels, or more than three levels within the scope of the invention.

Further, the coat hook 14 and the use of the clip 24 to secure the component to the sheet metal 44 of the vehicle are merely preferences and those skilled in the art may choose to employ the crash box technology with other components and other securing means. Further, the disclosed method of securing the coat hook 14 to the crash box 12 by means of the boss 39 of the coat hook 14 abutting the flange 27 of the crash box 12 and the tab 54 of the coat hook 14 engaging the recess 56 of the crash box 12 are preferred arrangements and any suitable method of securing the component to the crash box 12 can be used.

The crash box 12 can also be used to mount the components to the headliner before the headliner is installed into the vehicle.

Figure 6:
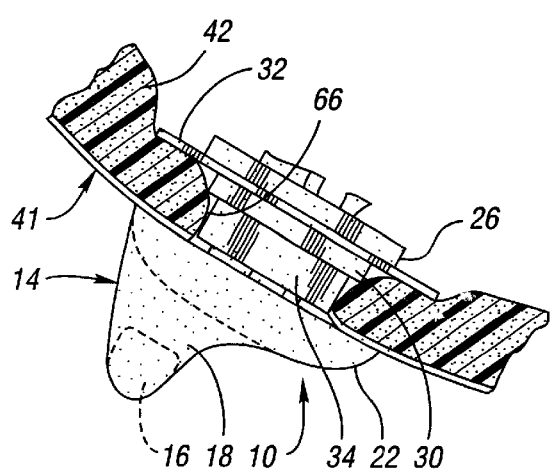
FIG. 6 is a side elevational view of a third embodiment of the invention.

Reference is now made to FIG. 6 in which like numerals have been used to describe like parts. The crash box 12 has several wings or ears 32 which are integrally formed with the box 12. These wings or ears 32 extend laterally of the lower end of the first level 26 above the headliner 41 to retain the crash box 12 and the coat hook 14 on the headliner 41 before the headliner is installed in the vehicle.

Figure 8:
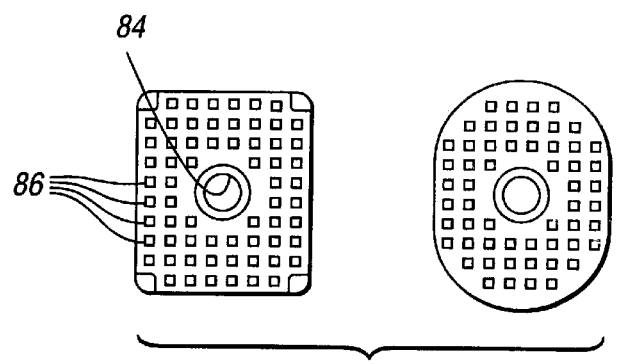
FIG. 8 shows a plan view of the energy dissipator shown in FIG. 7.
Figure 7:
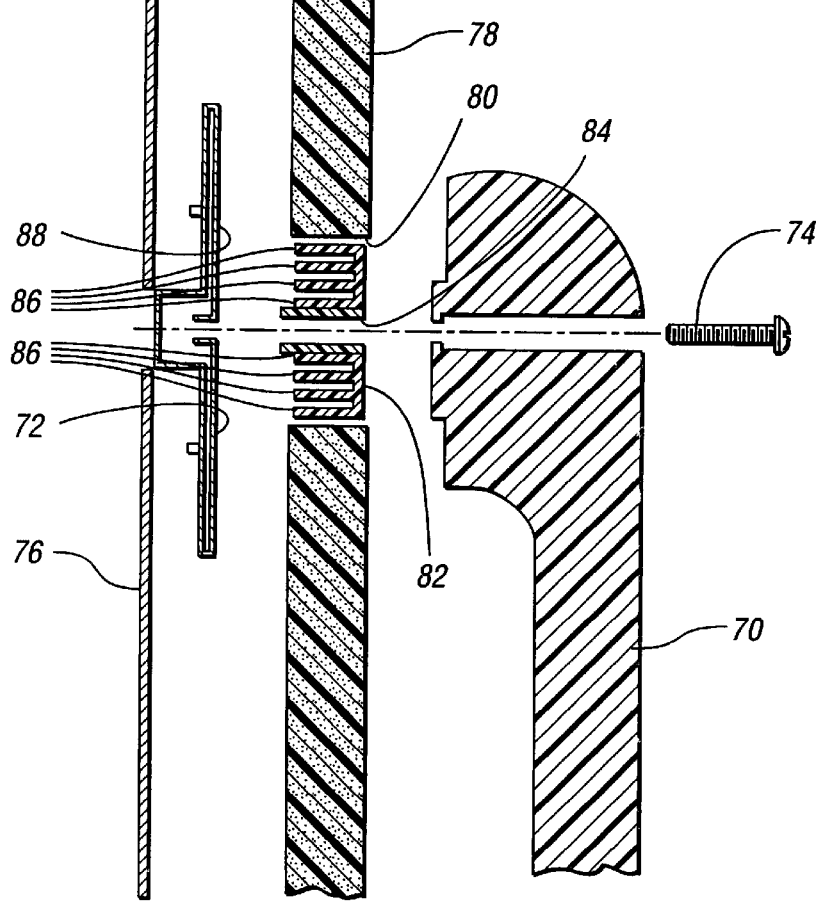
FIG. 7 shows an exploded perspective view of a fourth embodiment of the invention.

Referring to FIGS. 7 and 8, a fourth embodiment of the invention is shown. As illustrated, an overhead component such as a grab handle 70 is attached to a metal clip 72 by a bolt 74, and is thereby secured to the sheet metal 76 of a vehicle. A headliner 78 is positioned between the grab handle 70 and the sheet metal 76. The headliner 78 includes an aperture 80 formed therein which receives an energy dissipator 82. The energy dissipator 82 includes a hole 84 for receiving the bolt 74. Also, the energy dissipator 82 includes a plurality of deformable spikes 86 which are operative to dissipate energy during an impact.

The spikes 86 are preferably made of plastic or reinforced plastic, and are configured to break or deform when subject to a compressive lengthwise force during impact to absorb impact energy.

Specifically, the spikes 86 would engage against the front face 88 of the metal clip 72 as the energy dissipator 82 recedes toward the sheet metal 76 in a high energy impact.

The spikes 86 may be optimally sized for desired energy dissipation characteristics. This component is lightweight and inexpensive to manufacture, and may reduce the need for further head impact foam or other countermeasures in the vehicle.

Reasonable variation and modification are possible within the spirit of the foregoing specification and drawings without departing from the scope of the invention as defined in the appended claims.

What is claimed is:

1. An energy dissipation assembly for dissipating energy between a vehicle component and a vehicle sheet metal member, the assembly comprising:

a collapsible crash box forming a central aperture therethrough for receiving the vehicle component, said collapsible crash box including a plurality of collapsible levels oriented concentrically with respect to the central aperture;

wherein an uppermost one of said levels is positioned to abut against the sheet metal member and a lowermost one of said levels is positioned to abut against the component, such that a sufficient impact against the component causes collapse of the plurality of levels between the component and the sheet metal member, thereby dissipating energy of the impact, said collapsible levels being sequentially larger from one of the uppermost and lowermost levels to the other of the uppermost and lowermost levels to facilitate said collapse, and said crash box being spaced away from at least one of the sheet metal member and the component prior to movement upon said impact such that the crash box contacts both the sheet metal member and the component only during said impact; and wherein the component includes a clip for retaining and securing the component within the sheet metal member, said clip being disengagable from the sheet metal member during said sufficient impact to allow collapse of the plurality of levels.

2. The assembly of claim 1, wherein the component comprises a coat hook and the sheet metal member comprises a vehicle roof.

3. The assembly of claim 1, wherein the component includes a clip for retaining and securing the component within the sheet metal member, said clip being disengagable from the sheet metal member during said sufficient impact to allow collapse of the plurality of levels.

4. The assembly of claim 1, wherein said plurality of levels are formed in a stepped configuration.

5. The assembly of claim 1, wherein the crash box comprises resilient legs to retain the crash box to the sheet metal member when the component is removed.

6. The assembly of claim 1, wherein the crash box includes at least one ear extending outwardly from said uppermost one of the levels to-retin the crash box on a headliner before the headliner is installed in a vehicle.

7. The assembly of claim 1, wherein said plurality of collapsible levels comprise rectangular steps.

8. A vehicle headliner assembly attachable to a vehicle sheet metal member, the assembly comprising:

a headliner having an opening formed therethrough;

a vehicle component positioned within the opening and for attachment to the sheet metal member;

a collapsible crash box forming a central aperture therethrough receiving the vehicle component, said collapsible crash box including a plurality of collapsible levels oriented concentrically with respect to the central aperture, wherein an uppermost one of said levels is positioned to abut against the sheet metal member and a lowermost one of said levels is positioned to abut against the component, such that a sufficient impact against the component causes collapse of the plurality of levels between the component and the sheet metal member, thereby dissipating energy of the impact, and said crash box being spaced away from at least one of the sheet metal member and the component prior to movement during said impact such that the crash box contacts both the sheet metal member and the component only during said impact, and wherein the crash box comprises resilient legs to retain the crash box to the sheet metal member when the component is removed.

9. The assembly of claim 8, wherein the component comprises a coat hook.

10. The assembly of claim 8, wherein the component includes a clip for retaining and securing the component within an aperture formed in the sheet metal member, said clip being disengagable from the sheet metal member during said sufficient impact to allow collapse of the plurality of levels.

11. The assembly of claim 8, wherein said plurality of levels are formed in a stepped configuration.

12. The assembly of claim 8, wherein the crash box comprises resilient legs to retain the crash box to the sheet metal member when the component is removed.

13. The assembly of claim 8, wherein the crash box includes at least one ear extending outwardly from said uppermost one of the levels to retain the crash box on the headliner before the headliner is attached to the sheet metal member.

14. The assembly of claim 8, wherein said plurality of collapsible levels comprise rectangular steps.

15. An energy dissipation assembly for dissipating energy between a vehicle coat hook and a vehicle sheet metal member, the assembly comprising:

a collapsible crash box forming a central aperture therethrough for receiving the coat hook, said collapsible crash box including a plurality of collapsible levels oriented concentrically with respect to the central aperture; and wherein an uppermost one of said levels is positioned to abut against the sheet metal member and a lowermost one of said levels is positioned to abut against the coat hook, such that a sufficient impact against the coat hook causes collapse of the plurality of levels between the coat hook and the sheet metal member, thereby dissipating energy of the impact, and said crash box being spaced away from at least one of the sheet metal member and the coat hook prior to movement during said impact such that the crash box contacts both the sheet metal member and the coat hook only during said impact, and wherein the crash box includes at least one ear extending outwardly from said uppermost one of the levels to retain the crash box on a headliner before the headliner is attached to the sheet metal member.

16. The assembly of claim 15, wherein said crash box comprises a plastic component.

* * * * *

UNITED STATES PATENT AND TRADEMARK OFFICE
CERTIFICATE OF CORRECTION

PATENT NO.    : 6,422,644 B1
DATED         : July 23, 2002
INVENTOR(S)   : Dean T. Miller et al.

It is certified that error appears in the above-identified patent and that said Letters Patent is hereby corrected as shown below:

<u>Column 5,</u>
Line 25, delete "to-retin" and insert therefor -- to retain --.

Signed and Sealed this

Thirty-first Day of December, 2002

JAMES E. ROGAN
*Director of the United States Patent and Trademark Office*